J. SIEH.
VEHICLE COUPLING.
APPLICATION FILED SEPT. 15, 1908.

910,592.

Patented Jan. 26, 1909.

Inventor
John Sieh.

Witnesses

By C. A. Snow & Co.
Attorneys

UNITED STATES PATENT OFFICE.

JOHN SIEH, OF JAMES, SOUTH DAKOTA.

VEHICLE-COUPLING.

No. 910,592.

Specification of Letters Patent.

Patented Jan. 26, 1909.

Application filed September 15, 1908. Serial No. 453,135.

*To all whom it may concern:*

Be it known that I, JOHN SIEH, a citizen of the United States, residing at James, in the county of Brown and State of South Dakota, have invented a new and useful Vehicle-Coupling, of which the following is a specification.

This invention relates to vehicle couplings, and more particularly to that class which are designed for use in coupling a threshing machine or the like to a traction engine.

It is the primary object of the invention to provide a coupling of this class so constructed as to securely couple the engine and the implement being drawn and yet allow for instant release of the implement or machine from the engine when so desired.

Broadly speaking, the coupler embodied in my invention comprises a pivoted hook with which the usual ring at the extremity of the pole of the thresher or other machine to be drawn by the traction engine is engaged, and a detent device so arranged as to normally prevent the swinging of the hook on its pivot, the said detent device being engaged by the shank of the hook, and a pull rope or other means whereby the detent device may be rocked to release the said hook and permit swinging thereof to disengage the same from the ring on the thresher pole.

One of the novel and advantageous features of the invention resides in so relatively locating the pivot of the hook and the detent device that the line of extent of the detent device is normally tangential to the arc described by the extremity of the hook shank in swinging upon its pivot, so that a very substantial coupling is the result.

Figure 1:
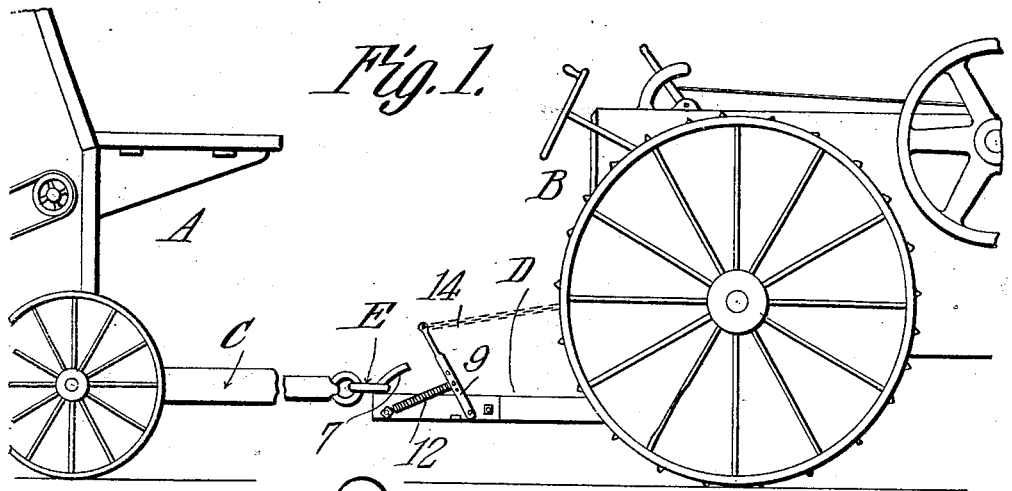
Figure 2:
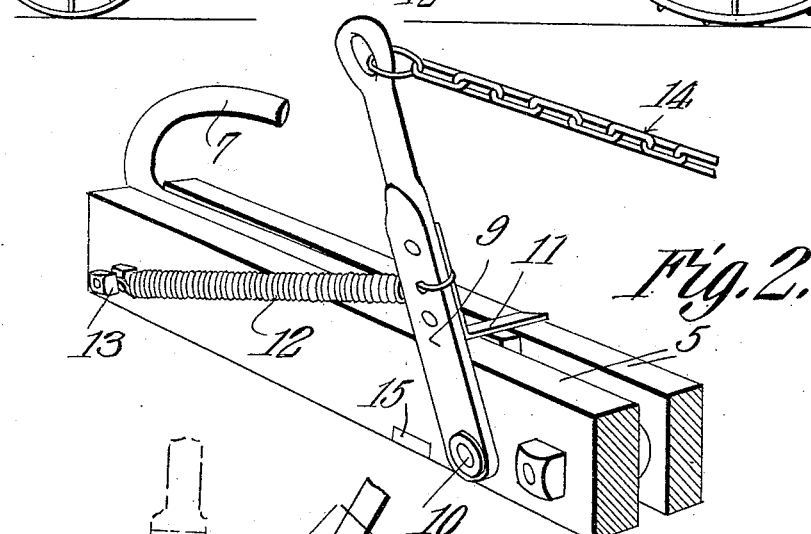
Figure 3:
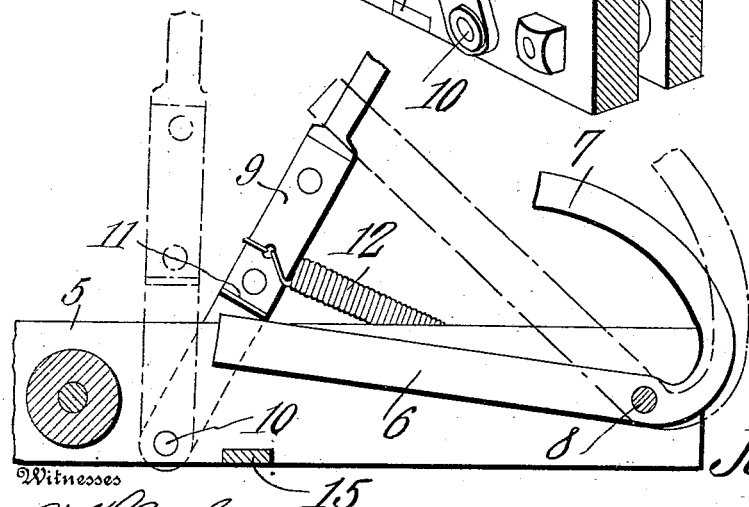

In the accompanying drawings:—Figure 1 is a view in side elevation of the forward end of a threshing machine and the rear end of a traction engine, showing the manner in which my invention is employed to couple the two vehicles. Fig. 2 is a detail perspective view of the coupling, and Fig. 3 is a vertical longitudinal sectional view of the coupling showing the normal position of the parts in full lines, and in dotted lines showing the position assumed when the hook is swung to releasing position.

In the drawings the reference character "A" indicates the forward portion of a threshing machine or other vehicle, and the reference character "B" indicates the rear end portion of a traction engine, the tongue or pole of the threshing machine being indicated by the character "C". The tongue "C" is provided at its end with the usual ring "E".

The coupling hook and the detent device for the hook, of the coupler, are supported by a pair of bars 5, which are bolted or otherwise secured to the under side of the platform "D" of the engine and extend rearwardly therefrom in spaced parallel relation. While I have illustrated the said bars 5 as being supported by the platform "D" of the traction engine, it will be understood that they may be equally well supported from some other convenient portion of the engine. The hook of the coupler is comprised of a shank 6 and a bill 7, the hook being curved upwardly and forwardly above the shank.

As before stated, it is intended that the ring fixed at the end of the pole of the threshing machine be engaged with the bill 7 of the hook of the coupler, and it will be understood that upon strain being exerted upon the hook, it will have a tendency to swing upon its pivot, its shank swinging upwardly, to disengage from the ring "E". In order to normally prevent the swinging of the hook, I have provided a detent device which is in the form of a lever 9 pivoted as at 10 to the side of one of the pair of bars 5, the pivot for the said detent lever being located forward of the extremity of the shank of the hook. The detent lever 9 extends vertically above the upper edges of the bar 5, and secured upon the said lever and extending at right angles therefrom, transversely above the bars 5, is a finger or stop 11, with which the shank of the hook of the coupler normally engages, so as to prevent the swinging of the hook on its pivot, the lever being held with its finger or stop 11 in position for such engagement by means of a spring 12, which is connected at one end to lever 9, and at the other end to a stud 13 secured upon that one of the bars 5 to which the lever is pivoted. It will be observed from an inspection of Fig. 3 of the drawing, the lever 9 is normally inclined rearwardly with its stop or finger 11 extending transversely above the bars 5 and the shank of the hook of the coupler the normal line of extent of the lever being substantially tangential to the arc described by the end of the hook shank, in swinging about its pivot. In order that the lever may be swung forwardly against the tension of the spring 12, so as to bring its finger 11 out of engagement with the shank of the hook, a chain or other flexible pull connection 14 is connected to the upper end of the lever and is led to any convenient point on the traction engine, it being understood that the threshing machine or other vehicle is drawn by the engine to the point desired and when it has been satisfactorily located, a pull is exerted upon the chain 14 and the shank of the hook is released, the strain exerted upon the hook then serves to swing it upon its pivot as shown in dotted lines in Fig. 3, whereby the bill of the hook is disengaged from the ring upon the pole of the threshing machine.

Claims:

In a device of the class described, a support comprised of a pair of spaced members, a hook pivoted between the members, the pivot for the hook being located at the point of junction of the shank of the hook with the bill thereof, said shank of the hook extending normally between the spaced members comprising the support with the bill of the hook projecting above the said members, a detent lever pivoted upon one of the members and extending there-above, said lever having a portion projecting transversely above the members comprising the support and above the extremity of the shank of the hook, said portion of the lever being normally in engagement with the upper edges of the said members and the upper edge of the shank of the hook, a spring connected at one end to the lever, and at its other end to the member upon which the lever is pivoted, and a flexible pull connection attached to the upper end of the lever above the point of connection of the spring therewith.

In testimony that I claim the foregoing as my own, I have hereto affixed my signature in the presence of two witnesses.

JOHN SIEH.

Witnesses:
  W. B. MILLER,
  F. E. BONDIMERE.